United States Patent
Tsujimoto et al.

(10) Patent No.: US 8,079,213 B2
(45) Date of Patent: Dec. 20, 2011

(54) EXHAUST GAS PURIFICATION SYSTEM FOR INTERNAL COMBUSTION ENGINE

(75) Inventors: Kenichi Tsujimoto, Susono (JP); Tomihisa Oda, Numazu (JP); Takanori Ueda, Susono (JP); Kuniaki Nimi, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 429 days.

(21) Appl. No.: 12/309,520

(22) PCT Filed: Jul. 24, 2007

(86) PCT No.: PCT/JP2007/064837
§ 371 (c)(1),
(2), (4) Date: Jan. 22, 2009

(87) PCT Pub. No.: WO2008/013298
PCT Pub. Date: Jan. 31, 2008

(65) Prior Publication Data
US 2009/0205323 A1 Aug. 20, 2009

(30) Foreign Application Priority Data
Jul. 24, 2006 (JP) .................... 2006-200862

(51) Int. Cl.
*F01N 3/00* (2006.01)
*F01N 3/10* (2006.01)
(52) U.S. Cl. ............... 60/295; 60/286; 60/287; 60/301
(58) Field of Classification Search ............. 60/295
See application file for complete search history.

(56) References Cited

U.S. PATENT DOCUMENTS

| | | | |
|---|---|---|---|
| 2003/0061802 A1* | 4/2003 | Nakatani et al. | 60/284 |
| 2003/0192306 A1* | 10/2003 | Nakatani et al. | 60/288 |
| 2004/0194449 A1* | 10/2004 | Schaller et al. | 60/285 |
| 2006/0059896 A1* | 3/2006 | Liu et al. | 60/286 |
| 2006/0260297 A1* | 11/2006 | Koch | 60/286 |

(Continued)

FOREIGN PATENT DOCUMENTS

DE 196 26 837 A1 1/1997

(Continued)

OTHER PUBLICATIONS

Chinese Office Action issued in Patent Application No. 200780027679.1; dated Aug. 17, 2010 (with translation).

(Continued)

*Primary Examiner* — Thomas Denion
*Assistant Examiner* — Jason Shanske
(74) *Attorney, Agent, or Firm* — Oliff & Berridge, PLC (57) ABSTRACT

An object of the invention is to provide a technique for improving the efficiency of performance regeneration process that is executed on NOx storage reduction catalysts provided in a plurality of branch passages branching from the exhaust passage and reduce emissions of NOx from an internal combustion engine to the atmosphere. When the quantity of NOx discharged from an internal combustion engine and flowing into an exhaust pipe is smaller than a predetermined quantity, fuel serving as reducing agent is added through a fuel addition valve while torque change moderating process is executed (from T0 to T1). After that, a first flow rate control valve is closed to make the flow rate of the exhaust gas flowing in the first branch passage smaller than that in the second branch passage (from T1 to T3).

4 Claims, 7 Drawing Sheets

U.S. PATENT DOCUMENTS

2007/0294999 A1  12/2007  Yoshizaki et al.

FOREIGN PATENT DOCUMENTS

| DE | 19626837 A1 * | 1/1997 |
|---|---|---|
| JP | A-2002-130008 | 5/2002 |
| JP | A-2003-020982 | 1/2003 |
| JP | A-2004-068785 | 3/2004 |
| WO | WO 2006/049309 A1 | 5/2006 |

OTHER PUBLICATIONS

International Search Report issued in Application No. PCT/JP2007/064837; dated Oct. 19, 2007.

* cited by examiner

FIG. 1

(a) accelerator opening degree AA (b) throttle opening degree TA (c) in-cylinder fuel injection quantity Q (d) first fuel addition valve

(e) first flow rate control valve

EXHAUST GAS PURIFICATION SYSTEM FOR INTERNAL COMBUSTION ENGINE

This application is the national phase application under 35 U.S.C. §371 of PCT international application No. PCT/JP2007/064837 filed on 24 Jul. 2007, which claims priority to Japanese patent application No. 2006-200862 filed on 24 Jul. 2006, the contents of which are incorporated herein by reference.

TECHNICAL FIELD

The present invention relates to an exhaust gas purification system for an internal combustion engine.

BACKGROUND ARTS

As a technique of removing nitrogen oxides (which will be hereinafter referred to as "NOx") contained in the exhaust gas of an internal combustion engine, it has been known to provide an NOx storage reduction catalyst (which will be hereinafter referred to as an "NOx catalyst") in the exhaust system of the internal combustion engine. Since the NOx removing ability of the NOx catalyst is deteriorated as the amount of NOx stored in the NOx catalyst increases, reduction of NOx is executed by supplying an reducing agent to the NOx catalyst and making the air-fuel ratio of the exhaust gas flowing into the NOx catalyst rich. (Such a process will be hereinafter referred to as the "NOx reduction process".)

In the NOx catalyst are also stored sulfur oxides (which will be hereinafter referred to as "SOx") contained in the exhaust gas according to a mechanism similar to the case of NOx. As the amount of SOx stored in the NOx catalyst increases, SOx poisoning that causes a decrease in the NOx storing ability of the NOx catalyst can occur in some cases. If it occurs, reduction of the SOx stored in the NOx catalyst is executed by raising the temperature of the NOx catalyst (e.g. up to 600° C.-650° C.) and supplying a reducing agent to the NOx catalyst. (Such a process will be hereinafter referred to as the "SOx poisoning elimination process".)

When the NOx reduction process or SOx poisoning elimination process (which will be collectively referred as the "performance regeneration process", hereinafter) is executed on an NOx catalyst, if the intake air quantity of the internal combustion engine is small, the quantity of the reducing agent flowing into the NOx catalyst can be insufficient in some cases even if the air-fuel ratio of the exhaust gas flowing into the NOx catalyst is made rich.

In connection with this, Japanese Patent Application Laid-Open No. 2002-130008 discloses a technique in which when the intake air quantity of the internal combustion engine is insufficient, execution of the performance regeneration process is disabled in order to prevent efficiency of the performance regeneration process from being deteriorated.

However, in the case where the performance regeneration process is executed on an NOx catalyst at a time when the intake air quantity is larger, the flow rate of the exhaust gas flowing in the exhaust passage is also larger, and accordingly the quantity of reducing agent required to be supplied to make the air-fuel ratio of the exhaust gas flowing into the NOx catalyst rich becomes larger. Therefore, fuel economy can be deteriorated in the case where fuel is used as the reducing agent, or the reducing agent can slip through the NOx catalyst and be emitted to the atmosphere, in some cases.

Japanese Patent Application Laid-Open No. 2003-20982 discloses a technique in which reducing agent is supplied to an NOx catalyst in a state where a throttle valve is closed while the internal combustion engine is decelerating and fuel-cut is being executed.

Japanese Patent Application Laid-Open No. 2004-68785 discloses a technique of performing rich spike control in which fuel is injected through a fuel injection valve provided in a cylinder when main fuel injection for combustion in the internal combustion engine is suspended during deceleration of the internal combustion engine to make the air-fuel ratio of the exhaust gas flowing into an NOx catalyst temporarily rich. According to this technique, the fuel injection pressure at the time when fuel is injected through the fuel injection valve in the rich spike control is designed to be higher than that in the main fuel injection, with a view to remove NOx with reliability.

In some exhaust gas purification systems, the exhaust passage of the internal combustion engine branches into two branch passages arranged in parallel each of which is provided with an NOx catalyst, and the flow rate of the exhaust gas flowing in each branch passage can be changed. In such systems, when the performance regeneration process is executed on the NOx catalyst disposed in one of the branch passages, the flow rate of the exhaust gas that flows into that branch passage is made small with a view to enhance the efficiency of the performance regeneration of the NOx catalyst. (Such process of making the flow rate of the exhaust gas small will be hereinafter referred to as the "low SV control".)

DISCLOSURE OF THE INVENTION

If the performance regeneration process is executed on an NOx catalyst by the low SV control when the flow rate of the exhaust gas from the internal combustion engine is relatively large, the flow rate of the exhaust gas flowing in the other branch passage in which the performance regeneration process is not executed increases. As a result, there is a possibility that NOx slips through the NOx catalyst provided in the other branch passage and the amount of NOx emitted to the atmosphere increases.

The present invention has been made in view of the above described problem, and has as an object to provide a technique for improving the efficiency of performance regeneration process that is executed on NOx catalysts provided in a plurality of branch passages branching from the exhaust passage and reducing emissions of NOx from an internal combustion engine to the atmosphere.

The present invention that is intended to achieve the above described object is characterized mainly in that when the quantity of NOx discharged from an internal combustion engine and flowing into an exhaust passage is smaller than a predetermined quantity, a performance regeneration process is executed for an NOx catalyst provided in at least one of a plurality of branch passages branching from the exhaust passage.

More specifically, an exhaust gas purification system for an internal combustion engine according to the present invention is characterized by:

an exhaust passage one end of which is connected to an internal combustion engine and through which exhaust gas from the internal combustion engine flows, a plurality of branch passages branching from said exhaust passage by a branching portion at some midpoint of said exhaust passage;

an NOx storage reduction catalyst that stores NOx in the exhaust gas when the air-fuel ratio of the inflowing exhaust gas is lean and reduces the NOx thus stored when the air-fuel ratio of the inflowing exhaust gas is rich and reducing agent is present, said NOx storage reduction catalyst being provided in at least one of said plurality of branch passages;

reducing agent supply unit for supplying reducing agent to the exhaust gas to be introduced into said NOx storage reduction catalyst;

exhaust gas flow rate changing unit for changing the flow rate of exhaust gas flowing in each branch passage; and regeneration unit for, when the quantity of NOx discharged from said internal combustion engine and flowing into said exhaust passage is smaller than a predetermined quantity, executing performance regeneration process for regenerating performance of said NOx storage reduction catalyst by supplying reducing agent to said NOx storage reduction catalyst from said reducing agent supply unit and thereafter causing said exhaust gas flow rate changing unit to reduce the flow rate of the exhaust gas flowing in the branch passage provided with the NOx storage reduction catalyst to which the reducing agent has been supplied to make it smallest in the plurality of branch passages.

In the exhaust gas purification system for an internal combustion engine as described above, reducing agent (for example, fuel) is supplied to the NOx catalyst by the reducing agent supply unit when the quantity of NOx that is discharged from the internal combustion engine and flowing into the exhaust passage is smaller than the predetermined quantity.

After the reducing agent is supplied to the NOx catalyst, the exhaust gas flow rate changing unit is caused to reduce the flow rate of the exhaust gas flowing in the branch passage in which the NOx catalyst to which the reducing agent has been supplied is provided to make it smallest in the plurality of branch passages.

With this feature, the reducing agent is prevented from being carried away to the downstream of the NOx catalyst by the exhaust gas flowing in the branch passage provided with the NOx catalyst to which the reducing agent has been supplied. Thus, the reducing agent stays or remains in the NOx catalyst, whereby the reduction reaction in the NOx catalyst can be promoted. For example, the flow rate of the exhaust gas flowing in the branch passage provided with the NOx catalyst to which the reducing agent has been supplied may be made substantially equal to zero. This enables to execute the performance regeneration process efficiently, and to cut down the quantity of the reducing agent to be supplied.

On the other hand, during the period over which the performance regeneration process continues, the flow rate of the exhaust gas flowing in the other branch passage(s) is larger than the flow rate of the exhaust gas flowing in the branch passage provided with the NOx catalyst to which the reducing agent has been supplied. However, the performance regeneration process according to the present invention is executed at a time when the quantity of NOx discharged from the internal combustion engine is smaller than the predetermined quantity, emission of a large amount of NOx to the exterior is prevented, and there is not a risk of an increase in harmful emissions.

Here, the aforementioned predetermined quantity of NOx flowing into the exhaust passage may be determined, for example, as an NOx quantity that is smaller, by a certain margin, than the NOx quantity that is unduly harmful if that quantity of NOx is emitted to the atmosphere from the internal combustion engine. This predetermined NOx quantity may be a constant value that is determined in advance. The time when the quantity of NOx discharged from the internal combustion engine is smaller than the predetermined quantity may include, for example, the time when fuel cut is executed in the internal combustion engine, and when the internal combustion engine is decelerating, idling or operating at low rotation speed and low load.

The plurality of branch passages branched by the branching portion at some midpoint of the exhaust passage may merge into an exhaust passage in the downstream of the branching portion. The NOx catalyst should be provided at least one of the branch passages, and it may be provided in every branch passage.

As per the above, the present invention can be applied to exhaust gas purification systems for an internal combustion engine provided with various types of exhaust passage. The aforementioned predetermined quantity may be determined based on whether the other branch passage(s) is provided with an NOx catalyst or not.

For example, in cases where an NOx catalyst is provided in the other branch passage(s), NOx can be stored in that NOx catalyst, and therefore the quantity of NOx emitted to the exterior can be reduced. In such cases, the predetermined quantity may be designed to be larger than that in cases where NOx catalyst is not provided in the other branch passage(s). Furthermore, the predetermined quantity may be determined according to the NOx storage capability (e.g. NOx storage capacity etc.) of the NOx catalyst.

The NOx catalyst in the present invention may be a catalyst that supports an NOx storage agent and stores NOx in the exhaust gas when the air-fuel ratio of the exhaust gas flowing into it is lean and reduces stored NOx when the air-fuel ratio of the exhaust gas flowing into it is rich and a reducing agent is present. The NOx catalyst may be a filter on which an NOx storage reduction catalyst is supported.

The reducing agent supply unit may include a reducing agent addition valve that injects reducing agent into the exhaust gas or a fuel injection valve that performs sub-injection to inject fuel during the expansion stroke or exhaust stroke etc. of the engine. In the case where the reducing agent supply unit is a reducing agent addition valve, a single reducing agent addition valve may be provided upstream of the branching portion of the exhaust passage, or a reducing agent addition valve may be provided in the branch passage provided with the NOx catalyst, upstream of the NOx catalyst.

The exhaust gas flow rate changing unit may be configured or arranged to be capable of changing the flow rate of the exhaust gas flowing in each branch passage. For example, a valve that can change the flow rate of the exhaust gas may be provided in every branch passage. Alternatively, a single valve that can change the flow rate of the exhaust gas flowing into each branch passage from the branching portion of the exhaust passage may be provided in the branching portion of the exhaust passage.

As per the above, according to the exhaust gas purification system for an internal combustion engine according to the present invention, when the performance regeneration process is executed on an NOx catalyst, the flow rate of the exhaust gas flowing in the branch passage that is provided with the NOx catalyst to which the reducing agent has been supplied becomes smallest in the plurality of branch passages. This enables to maintain a reducing atmosphere in the vicinity of the NOx catalyst. Thus, the efficiency of the performance regeneration process for the NOx catalyst can be enhanced, and fuel economy associated with the performance regeneration process can be improved.

Even if the state in which the flow rate of the exhaust gas flowing in the branch passage provided with the NOx catalyst to which the reducing agent has been supplied is small continues for a long time, emission of a large quantity of NOx to the exterior can be prevented from occuring, and an increase in harmful emissions can be prevented.

An exhaust gas purification system for an internal combustion engine according to the present invention may be characterized by:

an exhaust passage one end of which is connected to an internal combustion engine and through which exhaust gas from the internal combustion engine flows, a plurality of branch passages branching from said exhaust passage by a branching portion at some midpoint of said exhaust passage;

an NOx storage reduction catalyst that stores NOx in the exhaust gas when the air-fuel ratio of the inflowing exhaust gas is lean and reduces NOx thus stored when the air-fuel ratio of the inflowing exhaust gas is rich and reducing agent is present, said NOx storage reduction catalyst being provided in at least one of said plurality of branch passages;

reducing agent supply unit for supplying reducing agent to the exhaust gas to be introduced into said NOx storage reduction catalyst;

exhaust gas flow rate changing unit for changing the flow rate of exhaust gas flowing in each branch passage; and regeneration unit for, when the quantity of NOx discharged from said internal combustion engine and flowing into said exhaust passage is smaller than a predetermined quantity, executing performance regeneration process for regenerating performance of said NOx storage reduction catalyst by supplying reducing agent to said NOx storage reduction catalyst from said reducing agent supply unit and thereafter causing said exhaust gas flow rate changing unit to reduce the flow rate of the exhaust gas flowing in the branch passage provided with the NOx storage reduction catalyst to which the reducing agent has been supplied.

As per the above, when the performance regeneration process is executed on an NOx catalyst, it is not necessarily required that the flow rate of the exhaust gas flowing in the branch passage that is provided with the NOx catalyst to which the reducing agent has been supplied is smallest in the plurality of branch passages. If the flow rate of the exhaust gas flowing in the branch passage that is provided with the NOx catalyst to which the reducing agent has been supplied becomes smaller, the reducing agent stays or remains in the NOx catalyst. This enables to execute the performance regeneration process efficiently, and to cut down the quantity of the reducing agent to be supplied.

In the present invention, in the case where a plurality of branch passages are provided with the NOx catalyst, the performance regeneration process may be executed on the NOx catalyst provided in one branch passage, and thereafter the performance regeneration process may be executed on the NOx catalyst provided in another branch passage.

At the time when the reducing agent is supplied, the exhaust gas flow rate changing unit may make the flow rate of the exhaust gas flowing in the branch passage in which the NOx catalyst on which the performance regeneration process is executed is provided (which will be hereinafter referred to as the "performance regeneration target passage") larger than the flow rate of the exhaust gas flowing in the other branch passage(s). For example, all of the exhaust gas that is discharged from the internal combustion engine and flowing into the exhaust passage may be caused to flow through the performance regeneration target passage. This enables to supply the reducing agent rapidly to the NOx catalyst on which the performance regeneration process is to be executed.

Generally, when for example the degree of opening of the accelerator of the internal combustion engine becomes small suddenly by a deceleration request made by the driver, supply of fuel to be used in combustion in the internal combustion engine is stopped (such a process will be hereinafter referred to as "fuel cut") and the intake air quantity is decreased. When the above mentioned deceleration request is made, if the fuel supply and the intake air quantity are made substantially equal to zero instantaneously, a stepwise change in the torque may sometimes be caused due to abrupt change in the engine torque.

In view of this, according to the present invention, when stopping supply of fuel to be used in combustion in the internal combustion engine, the quantity of fuel supplied and the quantity of intake air may be decreased gradually (such a process will be hereinafter referred to as "torque change moderating process"). This enables to prevent the engine torque from changing abruptly even when supply of fuel to be used in combustion in the internal combustion engine is stopped. In connection with the above, the "gradual decrease" of the fuel supply quantity and intake air quantity includes the decrease in stages as well as the linear decrease and the non-linear continuous decrease.

In addition, the regeneration unit may cause the reducing agent to be supplied to the NOx catalyst when the flow rate of the exhaust gas flowing into the performance regeneration target passage is larger than or equal to a predetermined flow rate that is required to introduce the reducing agent supplied from the reducing agent supply unit into the NOx catalyst.

When the aforementioned torque change moderating process is executed, the intake air quantity decreases gradually and the flow rate of the exhaust gas flowing into the performance regeneration target passage decreases. If the flow rate of the exhaust gas flowing into the performance generation target passage is unduly small (e.g. smaller than the aforementioned predetermined flow rate), it is sometimes difficult to introduce the reducing agent into the NOx catalyst even if the reducing agent is supplied by the reducing agent supply unit.

In view of the above, according to the present invention, the reducing agent is supplied to the NOx catalyst when the flow rate of the exhaust gas flowing into the performance regeneration target passage is larger than or equal to the predetermined flow rate. Then, the reducing agent can be introduced into the NOx catalyst with reliability.

Here, the aforementioned predetermined flow rate may be determined as a flow rate larger, by a certain margin, than flow rates of the exhaust gas at which it is not possible to introduce the reducing agent to the NOx catalyst when the reducing agent is supplied by the reducing agent supply unit. The predetermined flow rate may be determined by, for example, experiments.

In the present invention, when stopping supply of fuel to be used in combustion in the internal combustion engine, the quantity of fuel supplied may be decreased gradually and the throttle opening degree may be decreased gradually. In addition, the regeneration unit may cause the reducing agent to be supplied to the NOx catalyst before the throttle opening degree becomes zero.

When the throttle opening degree is decreased gradually, the intake air quantity decreases gradually, and the flow rate of the exhaust gas flowing into the performance regeneration target passage decreases accordingly. As described above, if the flow rate of the exhaust gas flowing into the performance regeneration target passage is unduly small, it is sometimes difficult to introduce the reducing agent into the NOx catalyst even when the reducing agent is supplied by the reducing agent supply unit. In view of this, according to the present invention, by supplying the reducing agent to the NOx catalyst before the throttle opening degree becomes zero, the performance regeneration process can be executed on the NOx catalyst with higher reliability.

In the present invention, the time at which supply of fuel to be used in combustion in the internal combustion engine is stopped (fuel cut) includes, for example, the time at which operation of the internal combustion engine is stopped in a hybrid vehicle provided with a drive source such as an electric motor in addition to the internal combustion engine as well as the time at which the accelerator opening degree is abruptly decreased in response to a deceleration request made by the driver.

When the bed temperature of the NOx catalyst is excessively high at the time when the aforementioned torque change moderating process is executed, it is hardly allowed, in some cases, to supply the reducing agent to the NOx catalyst from the viewpoint of preventing excessive temperature rise or heat deterioration of the NOx catalyst. In such cases, there is a possibility that the reducing agent cannot be introduced into the NOx catalyst even if the reducing agent is supplied by the reducing agent supply unit, after the flow rate of the exhaust gas flowing into the performance regeneration target passage has become smaller than the predetermined flow rate that is required to introduce the reducing agent supplied from the reducing agent supply unit into the NOx catalyst.

In view of this, in the present invention, when the flow rate of the exhaust gas flowing into the performance regeneration target passage is smaller than the predetermined flow rate that is required to introduce the reducing agent supplied from the reducing agent supply unit into the NOx catalyst after supply of fuel to be used in combustion in said internal combustion engine has been stopped, the regeneration unit may cause the reducing agent to be supplied to said NOx catalyst after making the flow rate of the exhaust gas larger than or equal to the predetermined flow rate.

As per the above, even if the flow rate of the exhaust gas flowing into the performance regeneration target passage is smaller than the predetermined flow rate, the reducing agent supplied by the reducing agent supply unit can be introduced into the NOx catalyst with reliability by making the flow rate of the exhaust gas larger than or equal to the predetermined flow rate again. In addition, even if the reducing agent is not allowed to be supplied at the time of torque change moderating process for the reason that the temperature of the NOx catalyst is high, the reducing agent may be supplied later since the temperature decreases later.

In the present invention, when the throttle opening degree is zero after supply of fuel to be used in combustion in the internal combustion engine has been stopped, the throttle opening degree may be changed to a predetermined opening degree that is not equal to zero and maintained at that opening degree for a predetermined time period. In addition, the regeneration unit may cause the reducing agent to be supplied to the NOx catalyst after said throttle opening degree has been changed to said predetermined opening degree.

Here, the throttle opening degree is maintained at the predetermined opening degree for the predetermined time period. This predetermined time period may be determined in advance experimentally. Specifically, it may be determined, for example, based on the quantity of the reducing agent supplied by the reducing agent supply unit. In addition, the quantity of the reducing agent supplied may be determined based on the amount of NOx stored in the NOx catalyst, or alternatively it may be a constant quantity determined in advance. The aforementioned predetermined opening degree is such an opening degree other than zero that the reducing agent supplied by the reducing agent supply unit can be introduced into the NOx catalyst if the throttle opening degree is maintained at that degree for the aforementioned predetermined time period.

As per the above, even when supply of fuel to be used in combustion in the internal combustion engine has been stopped and the throttle opening degree is zero, the reducing agent can be introduced into the NOx catalyst by changing the throttle opening degree to the predetermined opening degree and maintaining that opening degree for the predetermined time period.

When the flow rate of the exhaust gas flowing into the performance regeneration target passage is made larger than or equal to the predetermined flow rate or when the throttle opening degree is changed to the predetermined opening degree that is not equal to zero and maintained at that opening degree for the predetermined time period as described above, fuel to be used in combustion in the internal combustion engine may be supplied to the engine. For example, a quantity of fuel required to achieve an excellent combustion state with the quantity of intake air drawn into the internal combustion engine in the state in which the predetermined throttle opening degree is maintained may be supplied. Then, the oxygen concentration in the exhaust gas introduced into the NOx catalyst can be reduced, and the efficiency of the performance regeneration process can be enhanced.

In the present invention, the performance regeneration process may be NOx reduction process for releasing NOx stored in the NOx catalyst or SOx poisoning elimination process for releasing SOx stored in the NOx catalyst. For example, when the NOx reduction process is executed, the air-fuel ratio of the exhaust gas introduced into the NOx catalyst may be made rich by the reducing agent supplied by the reducing agent supply unit. When the SOx poisoning elimination process is executed, the bed temperature of the NOx catalyst may be made high (e.g. 600° C.-650° C.) and the air-fuel ratio of the exhaust gas introduced into the NOx catalyst may be made rich.

In the present invention, when the quantity of NOx discharged from the internal combustion engine becomes larger than or equal to a predetermined quantity when the NOx reduction process is executed on the NOx catalyst, the flow rate of the exhaust gas flowing into the performance regeneration target passage may be increased by the exhaust gas flow rate changing unit and the NOx reduction process may be terminated.

When the quantity of NOx discharged from the internal combustion engine becomes larger than or equal to a predetermined quantity when the SOx poisoning elimination process is executed on the NOx catalyst, the flow rate of the exhaust gas flowing into the performance regeneration target passage may be increased by the exhaust gas flow rate changing unit and the SOx poisoning elimination process on the NOx catalyst may be continued.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENT

In the following, the best mode for carrying out the present invention will be described in detail based on exemplary embodiments. The dimensions, materials, shapes and relative positions and other features of the elements in the embodiments are not intended to limit the technical scope of the present invention, unless otherwise specified.

First Embodiment

Figure 1:
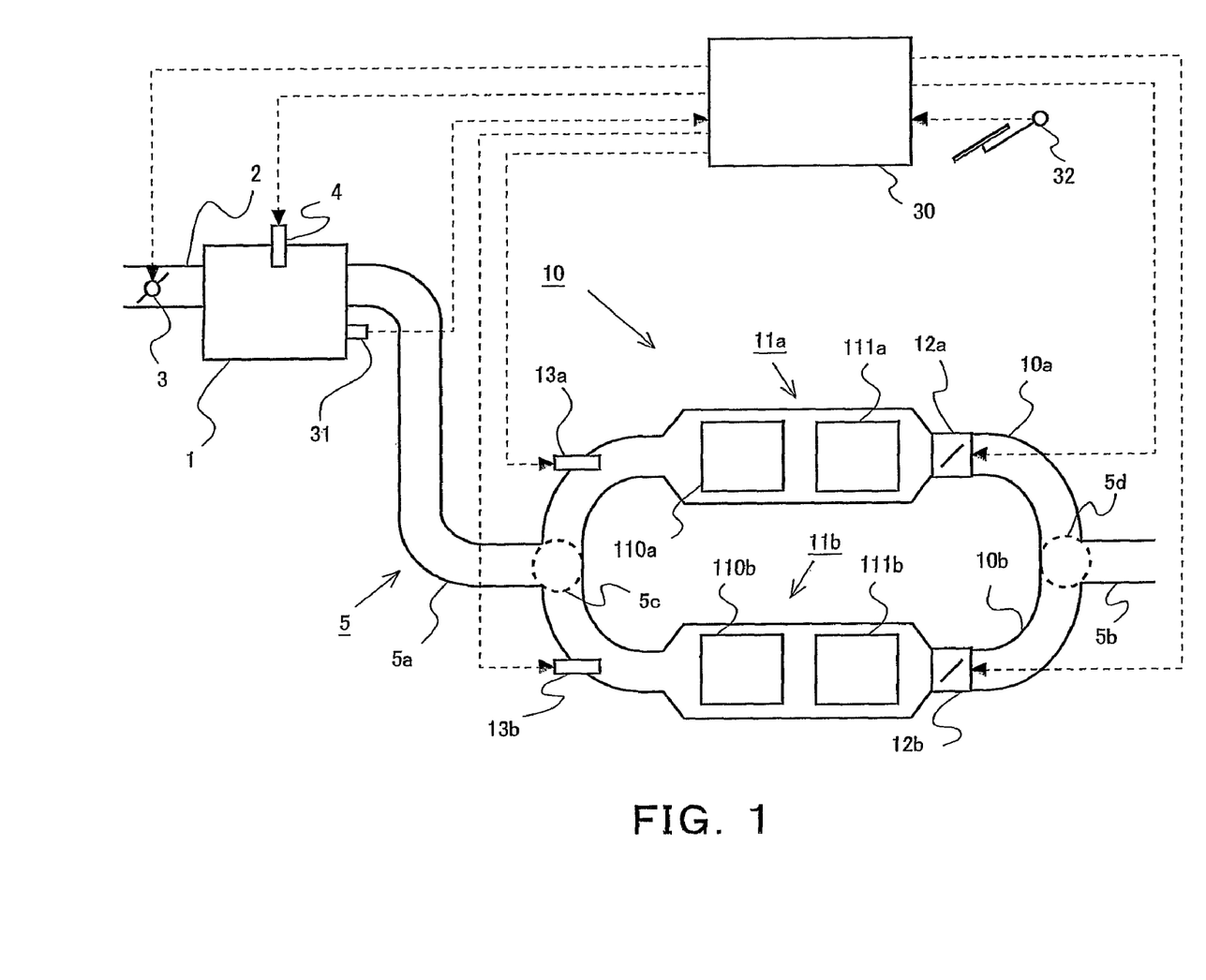
FIG. 1 is a diagram schematically showing the general structure of the internal combustion engine and its exhaust and control systems according to a first embodiment.

FIG. 1 schematically shows the general structure of an internal combustion engine 1 and its exhaust system and control system according to a first embodiment. In FIG. 1, illustration of the interior of the internal combustion engine 1 is omitted. In this embodiment, the exhaust passage branches into two branch passages at some midpoint thereof, and the branch passages merge into one passage at the downstream.

As shown in FIG. 1, to the internal combustion engine 1 is connected an intake pipe 2 through which intake air flows into the internal combustion engine 1. The intake pipe is provided with a throttle valve 3 for regulating the flow rate of the intake air flowing in the intake pipe 2. To the internal combustion engine 1 is also connected an exhaust pipe 5 in which the exhaust gas from the internal combustion engine 1 flows. The exhaust pipe 5 is connected to a muffler (not shown) at the downstream. The exhaust pipe 5 is provided with an exhaust gas purification portion 10 disposed at some midpoint thereof to remove particulate matter (e.g. soot) and NOx contained in the exhaust gas. Hereinafter, the portion of the exhaust pipe 5 upstream of the exhaust gas purification portion 10 will be referred to as the first exhaust pipe 5a, and the portion of the exhaust pipe 5 downstream of the exhaust gas purification portion 10 will be referred to as the second exhaust pipe 5b. The first exhaust pipe 5a branches at a branching portion 5c into a first branch passage 10a and a second branch passage 10b. The first branch passage 10a and the second branch passage 10b merge at a merging portion 5d.

The first branch passage 10a is provided with a first exhaust gas purification apparatus 11a that removes NOx contained in the exhaust gas and traps particulate matter (e.g. soot) in the exhaust gas. Similarly, the second branch passage 10b is provided with a second exhaust gas purification apparatus 11b. Here, the first exhaust pipe 5a and the second exhaust pipe 5b in this embodiment constitute the exhaust passage in the present invention. The first branch passage 10a and the second branch passage 10b constitute the branch passages in the present invention.

In the interior of the first exhaust gas purification apparatus 11a in this embodiment are provided a first NOx catalyst 110a on which NOx storage reduction catalyst is supported and a first filter 111a composed of a filter for trapping particulate matter in the exhaust gas and NOx storage reduction catalyst supported thereon. The first NOx catalyst 110a and the first filter 111a are arranged in series in order from the upstream side. Similarly, in the interior of the second exhaust gas purification apparatus 11b are provided a second NOx catalyst 110b and a second filter 111b arranged in order from the upstream side. In this embodiment, the first NOx catalyst 110a, the first filter 111a, the second NOx catalyst 110b and the second filter 111b constitute the NOx storage reduction catalyst in the present invention.

A first flow rate control valve 12a for changing the flow rate of the exhaust gas flowing in the first branch passage 10a is provided in the first branch passage 10a downstream of the first exhaust gas purification apparatus 11a. Similarly, a second flow rate control valve 12b is provided in the second branch passage 10b downstream of the second exhaust gas purification apparatus 11b. In this embodiment, the first flow rate control valve 12a and the second flow rate control valve 12b constitute the exhaust gas flow rate changing unit in the present invention.

The first branch passage 10a is equipped with a first fuel addition valve 13a, disposed upstream of the first exhaust gas purification apparatus 11a, for adding fuel as reducing agent into the exhaust gas when, for example, executing the NOx reduction process on the first exhaust gas purification apparatus 11a. Similarly, the second branch passage 10b is equipped with a second fuel addition valve 13b disposed upstream of the second exhaust gas purification apparatus 11b. In this embodiment, the first fuel addition valve 13a and the second fuel addition valve 13b constitute the reducing agent supply unit in the present invention.

To the internal combustion engine 1 and its exhaust system having the above described structure is annexed an electronic control unit (ECU) 30 for controlling the internal combustion engine 1 and the exhaust system. The ECU 30 is a unit that controls the operating state of the internal combustion engine 1 according to operating conditions of the internal combustion engine 1 and driver's demands, and executes controls associated with the exhaust gas purification portion 10 of the internal combustion engine 1.

The ECU 30 is connected, by electrical wiring, with sensors, such as a crank position sensor 31 and an accelerator position sensor 32, used to control the operating state of the internal combustion engine 1. The output signals of the sensors are input to the ECU 30. The ECU 30 is also connected, by electrical wiring, with an in-cylinder fuel injection valve 4 for injecting fuel to be used in combustion in the internal combustion engine 1, the first flow rate control valve 12a, the second flow rate control valve 12b, the first fuel addition valve 13a and the second fuel addition valve 13b. These elements are controlled by the ECU 30.

The ECU 30 has a CPU, ROM and RAM etc. The ROM stores programs for executing various control of the internal combustion engine 1 and a map(s) in which data is stored. The programs stored in the ROM in the ECU 30 include an NOx reduction process routine for reducing NOx stored in the first exhaust gas purification apparatus 11a and the second exhaust gas purification apparatus 11b and an SOx poisoning elimination process routine. In this embodiment, the ECU 30 that executes these processes constitutes the regeneration unit in the present invention.

Next, the control process in executing the NOx reduction process for the first exhaust gas purification apparatus 11a and the second exhaust gas purification apparatus 11b in the exhaust gas purification system according to the present invention will be described. As described before, in this embodiment the NOx reduction process is executed when the quantity of NOx discharge from the internal combustion engine 1 is smaller than a predetermined NOx quantity that is determined as a value smaller, by a sufficient margin, than the NOx quantity that is unduly harmful if emitted to the atmosphere. In this embodiment, an operating state in which deceleration of the internal combustion engine 1 is requested and fuel injection through the in-cylinder fuel injection valve 4 is suspended (such suspension of fuel injection will be hereinafter referred to as "fuel cut") will be described as an example of the operating state in which the quantity of NOx discharged from the internal combustion engine 1 is smaller than the predetermined NOx quantity. In the following description, it is assumed that the second flow rate control valve 12b is open while this control process is executed.

Figure 2:
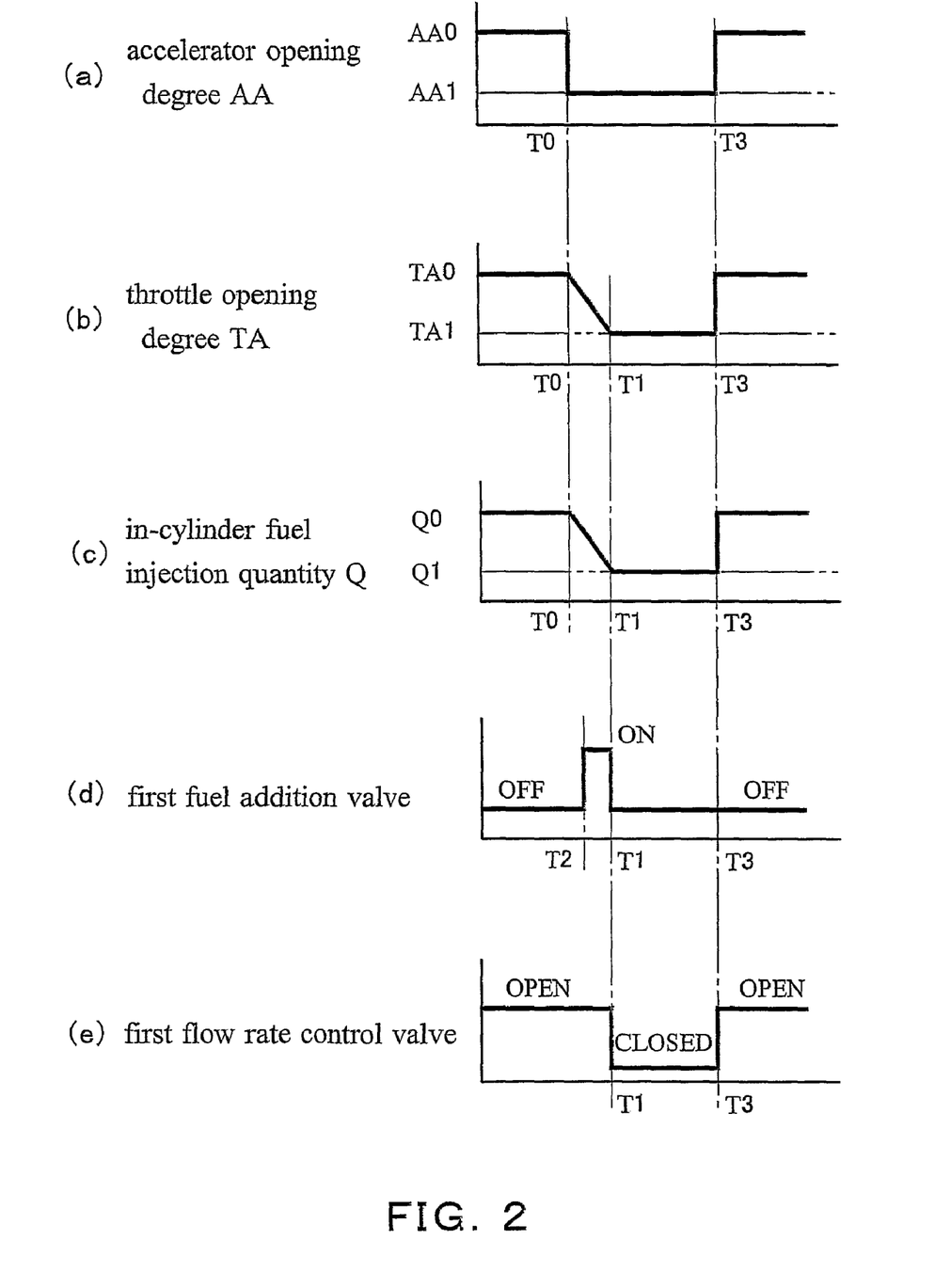
FIG. 2 is a time chart showing the operating states of various components at the time when fuel cut is executed in the first embodiment. Time chart (a) represents the accelerator opening degree AA, time chart (b) represents the throttle opening degree TA, time chart (c) represents the in-cylinder fuel injection quantity Q, time chart (d) represents the open/close state of a first fuel addition valve, and time chart (e) represents the open/close state of a first flow rate control valve.

FIG. 2 is a time chart showing the operating states of various components at the time when fuel cut is executed in this embodiment. Chart (a) in FIG. 2 represents the degree of opening AA of the accelerator, chart (b) in FIG. 2 represents the degree of opening TA of the throttle, chart (c) in FIG. 2 represents the quantity of in-cylinder fuel injection Q through the in-cylinder fuel injection valve 4, chart (d) in FIG. 2 represents the open/close state of the first fuel addition valve 13a, and chart (e) in FIG. 2 represents the open/close state of the first flow rate control valve 12a.

Referring to chart (a) in FIG. 2, when the accelerator opening degree AA is at level "AA0", the accelerator assumes a predetermined degree of opening other than the fully-closed state but including the fully-opened state, and when the accelerator opening degree AA is at level "AA1", it is fully closed. Referring to chart (b) in FIG. 2, when the throttle opening degree TA is at level "TA0", the throttle assumes a predetermined degree of opening other than the fully-closed state but including the fully-opened state, and when the throttle opening degree TA is at level "TA1", it is fully closed. Referring to chart (c) in FIG. 2, when the in-cylinder fuel injection quantity Q is at level "Q0", a quantity of fuel with which engine torque that is required in association with the degree of opening of the accelerator at AA0 is achieved is injected, and when the in-cylinder fuel injection quantity Q is at level "Q1", fuel injection is suspended. Referring to chart (d) in FIG. 2, when the first fuel addition valve 13a is at level "ON", fuel is added into the exhaust gas, and when the first fuel addition valve 13a is at level "OFF", fuel addition is suspended. Referring to chart (e) in FIG. 2, when the first flow rate control valve 12a is at level "OPEN", the degree of opening of the first flow rate control valve 12a assumes a predetermined degree of opening other than the fully-closed state but including the fully-opened state, and when the first flow rate control valve 12a is at level "CLOSED", it assumes a predetermined degree of opening other than the fully-opened state but including the fully closed state.

First, as shown in chart (a) in FIG. 2, a deceleration request is made to the internal combustion engine 1 at time T0, and the accelerator opening degree AA is changed from AA0 to AA1 (full close). Then, as shown in chart (b) in FIG. 2, the throttle opening degree TA is changed from TA0 to TA1 (full open) over the time period from T0 to T1, whereby the air intake quantity of the internal combustion engine 1 is decreased.

On the other hand, in this embodiment, as shown in chart (c) in FIG. 2, the in-cylinder fuel injection quantity Q or the quantity of fuel injected through the in-cylinder fuel injection valve 4 is decreased gradually over the time period from T0 to T1, and the fuel injection is stopped (Q1) at time T1. Here, the process of gradually decreasing the in-cylinder fuel injection quantity may include the process of gradually shortening the fuel injection time in one fuel injection. Since the throttle opening degree TA and the in-cylinder fuel injection quantity Q are decreased gradually as per the above, a stepwise change in the torque due to an abrupt change in the engine torque TQ can be prevented from occurring. (Hereinafter, this way of control will be referred to as "torque change moderating control".)

In connection with the above, time T1 denotes the time at which the throttle opening degree TA becomes equal to TA1 (full close) and fuel injection through the in-cylinder fuel injection valve 4 is stopped. This time T1 may be determined, for example, based on the amount of change in the throttle opening degree TA (i.e. TA0-TA1) or the amount of change in the in-cylinder fuel injection quantity. Q (i.e. Q0-Q1). Alternatively, time T1 may be determined in such a way that the time period from T0 to T1 does not become so short as to deteriorate drivability. Alternatively, time T1 may be determined in such a way that the time period from T0 to T1 does not become so long as to deteriorate response in changing the operating state of the internal combustion engine 1.

As shown in charts (d) and (e) in FIG. 2, at time T2 at which the first flow rate control valve 12a is in an open state, fuel for use in the NOx reduction process for the first exhaust gas purification apparatus 11a (including the first NOx catalyst 110a and the first filter 111a) is added into the exhaust gas through the first fuel addition valve 13a. The fuel addition through the first fuel addition valve 13a is stopped at time T1 at which the throttle opening degree TA becomes TA1 (full close).

At time T1 at which fuel addition is stopped, the flow rate of the exhaust gas in the vicinity of the first fuel addition valve 13a is larger than or equal to a predetermined flow rate. The predetermined flow rate is a flow rate that is larger, by a sufficient margin, than the flow rate of the exhaust gas at which it is not possible to introduce the fuel added through the first fuel addition valve 13a into the first exhaust purification apparatus 11a. The time at which fuel addition through the fuel addition valve 13a is stopped may be either before or after time T1 on condition that the flow rate of the exhaust gas is larger than or equal to the aforementioned predetermined flow rate.

In this embodiment, the first flow rate control valve 12a is closed at time T1. As a result, the flow rate of the exhaust gas flowing through the first exhaust gas purification apparatus 11a (including the first NOx catalyst 110a and the first filter 111a) decreases steeply, and accordingly fuel can be caused to stay in the exhaust gas purification apparatus 11a. Thus, the efficiency of the NOx reduction process is enhanced and fuel economy associated with the NOx reduction process can be improved.

It should be noted that what is meant by describing that the first flow rate control valve 12a is "closed" is that the degree of opening of the first flow rate control valve 12a is changed to a predetermined degree of opening smaller than that before time T1 and including the fully closed state. In this embodiment, the degree of opening of the first flow rate control valve 12a is changed in such a way, at least, that the flow rate of the exhaust gas flowing in the first branch passage 10a becomes smaller than the flow rate of the exhaust gas flowing in the second branch passage 10b.

Next, when the accelerator opening degree AA is changed from AA1 (full close) back to AA0 at time T3, the required torque of the internal combustion engine 1 increases. Accordingly, the throttle opening degree TA is changed from TA1 (full close) to TA0, and fuel injection through the in-cylinder fuel injection valve 4 is started.

Then, the quantity of NOx discharged from the internal combustion engine 1 increases. In view of this, the first flow rate control valve 12a is opened at time T3. As a result, the first flow rate control valve 12a and the second flow rate control valve 12b are in opened states, and consequently NOx discharged from the internal combustion engine 1 is removed by the first exhaust gas purification apparatus 11a and the second exhaust gas purification apparatus 11b. Thus, increases in the harmful emissions accompanied by discharge of a large amount of NOx to the atmosphere can be prevented. It should be noted that what is meant by describing that the first flow rate control valve 12a is "opened" is that the degree of opening of the first flow rate control valve 12a is changed to a predetermined degree of opening larger than that before time T3 and including the fully opened state.

Figure 3:
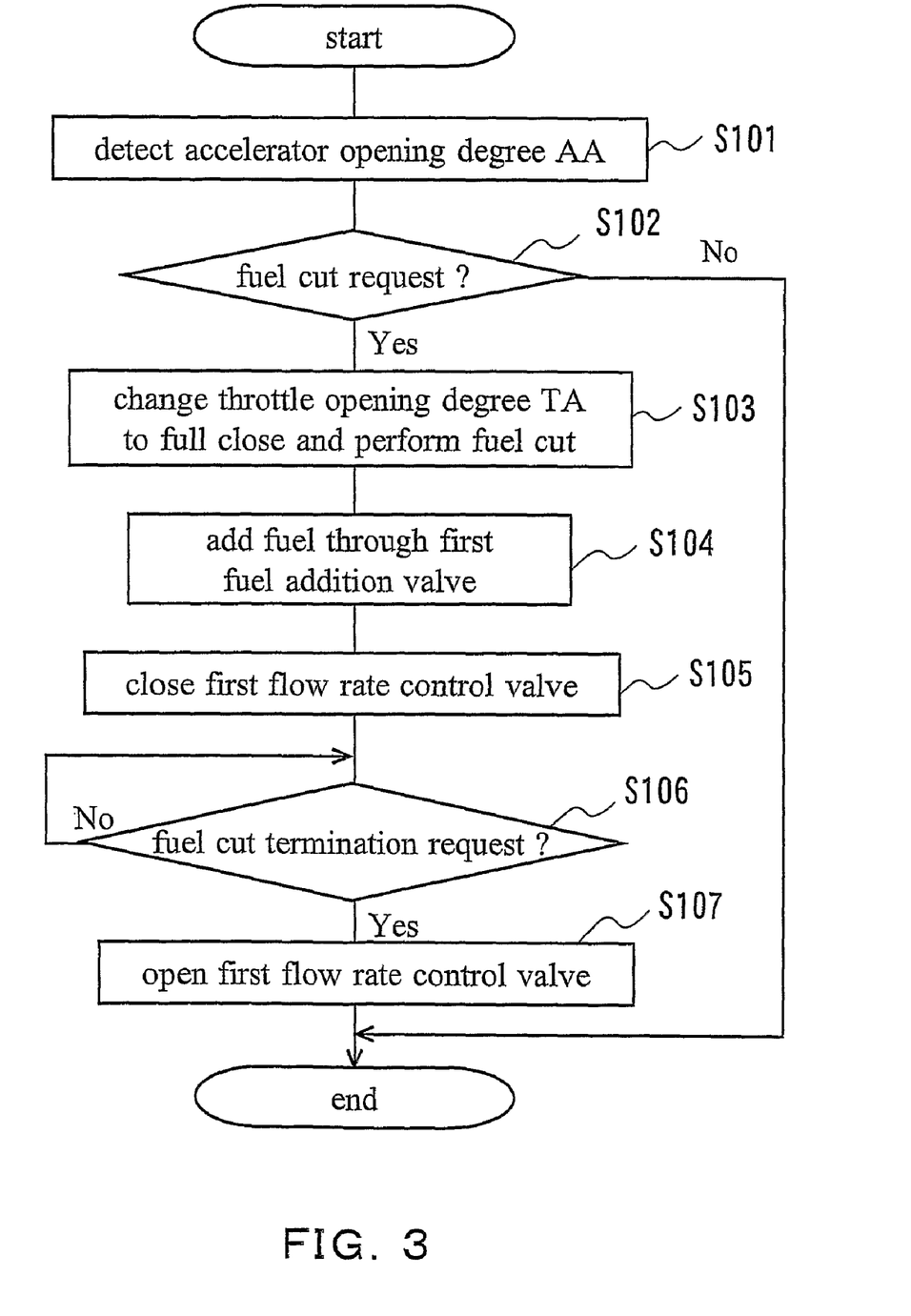
FIG. 3 is a flow chart of an NOx reduction routine according to the first embodiment.

FIG. 3 is a flow chart of an NOx reduction routine in this embodiment. This routine is a program stored in the ROM in the ECU 30 and executed at predetermined time intervals while the internal combustion engine 1 is running.

When this routine is executed, first in step S101, the accelerator opening degree AA is detected. Specifically, the accelerator opening degree AA is detected based on the output value of the accelerator position sensor 32. After completion of the process of step S101, the process proceeds to step S102.

In step S102, a determination is made as to whether or not a fuel cut request is made to the internal combustion engine 1, based on the accelerator opening degree AA detected in step S101. For example, a determination is made as to whether or not the accelerator opening degree AA is the fully closed state. Alternatively, this determination may be made based, for example, on the accelerator opening degree AA and the engine rotation speed Ne detected based on the output value of the crank position sensor 31. In other words, in this step, a determination is made as to whether or not the current operating state is suitable for executing the NOx reduction process. If it is determined that the fuel cut request is not made, execution of this routine is once terminated. On the other hand, if it is determined that the fuel cut request is made, the process proceeds to step S103.

In step S103, the throttle opening degree TA of the throttle valve 3 is changed to the fully closed state by the ECU 30, and fuel cut or suspension of fuel injection through the in-cylinder fuel injection valve 4 is executed. In this embodiment, the throttle opening degree TA and the in-cylinder fuel injection quantity Q are decreased gradually. This prevents occurrence of a stepwise change in the torque caused by abrupt change in the engine torque. After completion of the process of step S103, the process proceeds to step S104.

In step S104, a predetermined quantity of fuel is added into the exhaust gas through the first fuel addition valve 13a. Here, the predetermined quantity is a quantity that is necessary to reduce NOx stored in the first exhaust gas purification apparatus 11a. Specifically, for example, the predetermined quantity may be determined based on the amount of NOx stored in the first exhaust gas purification apparatus 11a or it may be a constant amount that has been determined in advance. After completion of the process of step S104, the process proceeds to step S105.

In step S105, the first flow rate control valve 12a is closed, whereby the flow rate of the exhaust gas flowing in the first exhaust gas purification apparatus 11a is decreased. Consequently, NOx reduction reaction in the first NOx catalyst 110a and the first filter 111a is promoted. After completion of the process of step S105, the process proceeds to step S106.

In step 106, a determination is made as to whether or not a fuel cut termination request is made. Specifically, this determination may be made based on the accelerator opening degree AA in a manner similar to the process of step S102. To put it differently, in this step, a determination is made as to whether or not the current operating state has been changed to a state that is not suitable for executing the NOx reduction process according to the present invention. If it is determined that the fuel cut termination request is not made, the state after the process of step S105 is maintained. Specifically, the NOx reduction process for the first NOx catalyst 110a and the first filter 111a is continued in the state in which the first flow rate control valve 12a is closed. On the other hand, if it is determined that the fuel cut termination request is made, the process proceeds to step S107. In step S107, the first flow rate control valve 12a is opened. After completion of the process of step S107, execution of this routine is once terminated.

As per the above, according to the present invention, after fuel is added through the first fuel addition valve 13a into the exhaust gas in the first branch passage 10a, an NOx reducing atmosphere can be maintained in the ambient of the first exhaust gas purification apparatus 11a. Thus, fuel economy associated with the NOx reduction process can be improved.

Since the NOx reduction process according to this embodiment is executed at a time of fuel cut in which the quantity of NOx discharged from the internal combustion engine 1 is small, NOx is prevented from slipping through the second exhaust gas purification apparatus 11b provided in the second branch passage 10b and from being emitted to the atmosphere. Although in this embodiment, the process of reducing NOx stored in the first exhaust gas purification apparatus 11a has been described by way of example, the control process according to this embodiment can also be applied to the process of reducing NOx stored in the second exhaust gas purification apparatus 11b.

Although in this embodiment, the second branch passage 10b is also provided with the second exhaust gas purification apparatus 11b, the process can also be applied to an exhaust gas purification system that is not provided with the second exhaust gas purification apparatus 11b. At times of fuel cut, combustion is not executed in the internal combustion engine 1, and accordingly NOx is barely generated. Therefore, little NOx is contained in the exhaust gas, and the exhaust gas is not necessarily required to be purified.

Although in this embodiment, the first exhaust pipe 5a may branch at a branching portion 5c into more than two branch passages. In this case, it is preferable that the flow rate of the exhaust gas flowing in the first branch passage 10a becomes smaller than the flow rate of the exhaust gas flowing in the others when the NOx reduction process is executed on the first exhaust gas purification apparatus 11a.

Second Embodiment

In the following, a second embodiment of the present invention will be described. The structure of the internal combustion engine 1 according to the second embodiment is the same as that according to the first embodiment, and a detailed description thereof will be omitted. In this embodiment also, a description will be made, by way of example, of a case in which the NOx reduction process is executed on the first exhaust gas purification apparatus 11a (including the first NOx catalyst 110a and the first filter 111a) at a time when fuel cut is executed in response to a deceleration request made to the internal combustion engine 1. In the following description, it is assumed that the second flow rate control valve 12b is open.

In this embodiment, a description will be made of a case in which the NOx reduction process is executed on the first exhaust gas purification apparatus 11a after fuel cut has been executed rather than when the aforementioned torque change moderating control is executed. For example, when the torque change moderating control is executed, the bed temperature of the first NOx catalyst 110a or the first filter 111a may be so high, in some cases, that fuel as reducing agent should not be supplied from the viewpoint of prevention of excessive temperature rise and heat deterioration. It is more preferable that the control process for the NOx reduction process according to this embodiment be executed in such cases.

Figure 4:
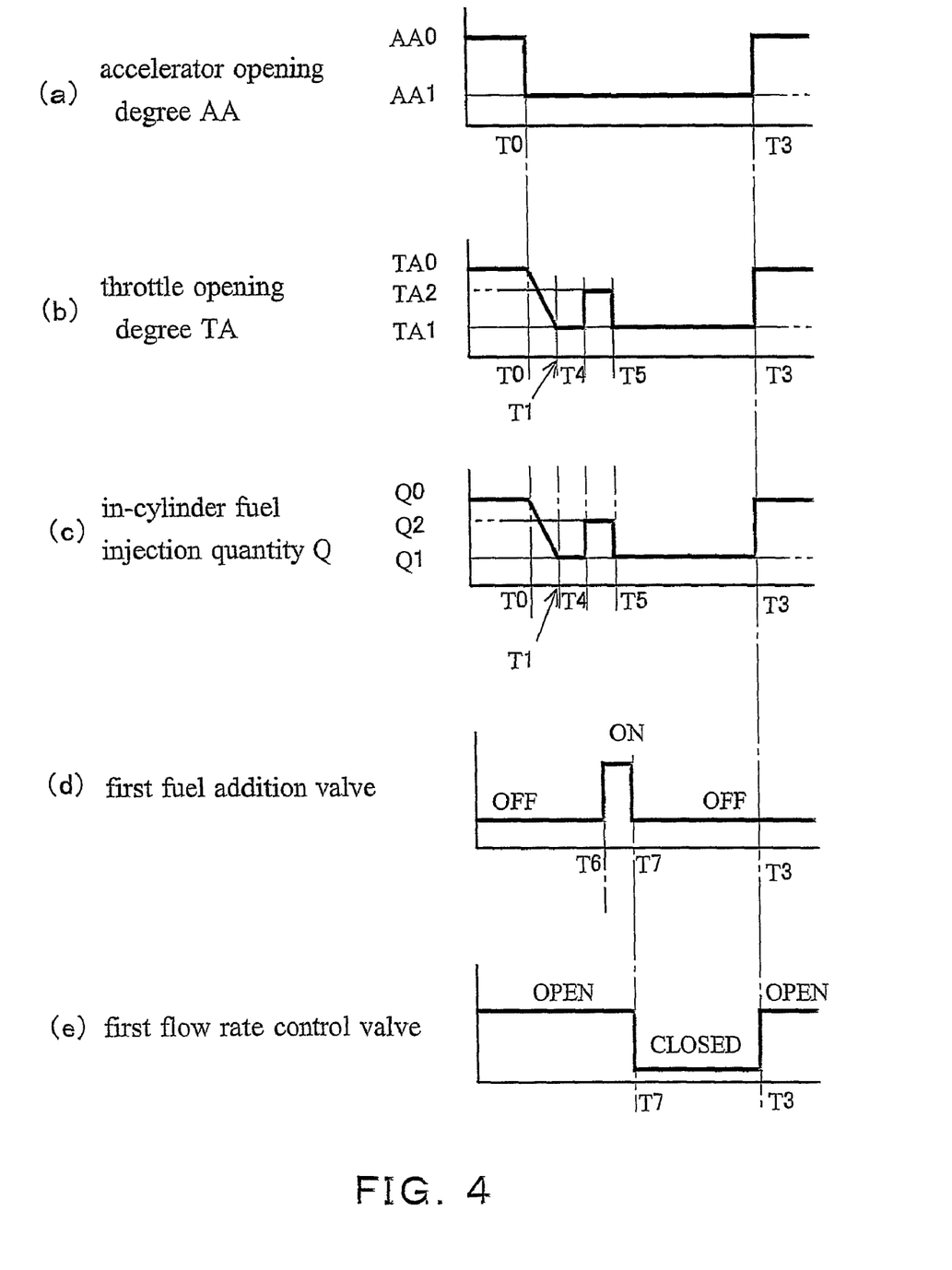
FIG. 4 is a time chart showing the operating states of various components at the time when fuel cut is executed in a second embodiment. Time chart (a) represents the accelerator opening degree AA, time chart (b) represents the throttle opening degree TA, time chart (c) represents the in-cylinder fuel injection quantity Q, time chart (d) represents the open/close state of a first fuel addition valve, and time chart (e) represents the open/close state of a first flow rate control valve.

FIG. 4 is a time chart showing the operating states of various components at the time when fuel cut is executed in this embodiment. Like signs are used in FIGS. 3 and 4 to denote like statuses.

First, as shown in chart (a) in FIG. 4, when the accelerator opening degree AA is changed from AA0 to AA1 (full close) at time T0, the aforementioned torque change moderating control is executed over the time period from T0 to T1 as shown in charts (b) and (c) in FIG. 4. Specifically, the throttle opening degree TA is changed gradually from TA0 to TA1 (full close), and the in-cylinder fuel injection quantity Q is decreased gradually from Q0 to stop fuel injection at time T1.

When the bed temperature of the first NOx catalyst 110a or the first filter 111a at the time when the torque change moderating process is executed is so high that fuel cannot be supplied, the flow rate of the exhaust gas in the vicinity of the first fuel addition valve 13a may be smaller than the predetermined flow rate, in some cases. In such cases, it is difficult to deliver fuel to the first exhaust gas purification apparatus 11a even if fuel is added into the exhaust gas in the first branch passage 10a through the first fuel addition valve 13a.

In view of the above, in this embodiment, the throttle opening degree TA is changed to a predetermined opening degree TA2 at time T4. This makes the flow rate of the exhaust gas in the first branch passage 10a larger than or equal to the predetermined flow rate again.

The aforementioned predetermined opening degree TA2 is a specific constant opening degree other than the fully-closed state but including the fully-opened state and determined in advance. At the predetermined opening degree TA2, the flow rate of the exhaust gas in the vicinity of the first fuel addition valve 13a can be made larger than or equal to the predetermined flow rate, and the fuel added through the first fuel addition valve 13a can be introduced into the first exhaust gas purification apparatus 11a. In this embodiment, the predetermined opening degree TA2 corresponds to the predetermined opening degree defined in the present invention.

In this embodiment, the in-cylinder fuel injection quantity Q or the quantity of fuel injected through the in-cylinder fuel injection valve 4 is changed from Q1 to Q2 at the aforementioned time T4. Here, in-cylinder fuel injection quantity Q2 is a fuel injection quantity other than Q1 (no injection), and it may be set, for example, to a fuel injection quantity that is required to provide a good combustion condition in relation to the intake air drawn into the internal combustion engine 1 when the throttle opening degree TA has been changed to the predetermined opening degree TA2. Alternatively, in-cylinder fuel injection quantity Q2 may be set to a fuel injection quantity required to making the air-fuel ratio of the exhaust gas flowing into the exhaust pipe 5 equal to a predetermined air-fuel ratio. The value of in-cylinder fuel injection quantity may be determined in advance experimentally.

In this embodiment, at time T5, the throttle opening degree TA is changed back to TA1 (full close), and fuel injection through the in-cylinder fuel injection valve 4 is stopped (Q1). Here, the time period during which the throttle opening degree TA is maintained at the predetermined opening degree TA2 (i.e. the time period from T4 to T5) is determined based on the quantity of fuel added through the first fuel addition valve 13a (which will be described later), and this time period is determined in advance experimentally. In this embodiment, this time period corresponds to the predetermined time period defined in the present invention. The larger the quantity of fuel added through the first fuel addition valve 13a is, the longer the time period during which the throttle opening degree TA is maintained at the predetermined opening degree TA2 may be made. The reason for this is that it is required that the flow rate of the exhaust gas in the vicinity of the first fuel addition valve 13a be larger than or equal to the predetermined flow rate at the time when fuel addition through the first fuel addition valve 13a is stopped.

Next, as shown in charts (d) and (e) in FIG. 4, fuel is added into the exhaust gas through the first fuel addition valve 13a over the time period from T6 to T7. Here, time T6 is determined as a time at the flow rate of the exhaust gas in the vicinity of the fuel addition valve 13a is larger than or equal to the predetermined flow rate by changing the throttle opening degree TA to the predetermined opening degree TA2. Time T7 or the time at which fuel addition through the first fuel addition valve 13a is stopped may be either before or after time T5 so long as the flow rate of the exhaust gas in the vicinity of the fuel addition valve 13a is larger than or equal to the predetermined flow rate. Time T7 may be determined based on time T5.

At time T7, the first flow rate control valve 12a is closed. Accordingly, the NOx reduction process is executed in the state in which the flow rate of the exhaust gas flowing in the first exhaust gas purification apparatus 11a is decreased. When the accelerator opening degree is changed from AA1 (full close) back to AA0 at the aforementioned time T3, the throttle opening degree TA is changed to TA0 and fuel injection through the in-cylinder fuel injection valve 4 is started. The NOx reduction process is terminated by opening the first flow rate control valve 12a.

Although in this embodiment fuel is injected through the in-cylinder fuel injection valve 4 over the aforementioned time period from T4 to T5, fuel injection through the in-cylinder fuel injection valve 4 is not necessarily required to be performed if the flow rate of the exhaust gas in the vicinity of the first fuel addition valve 13a is larger than or equal to the predetermined flow rate.

Figure 5:
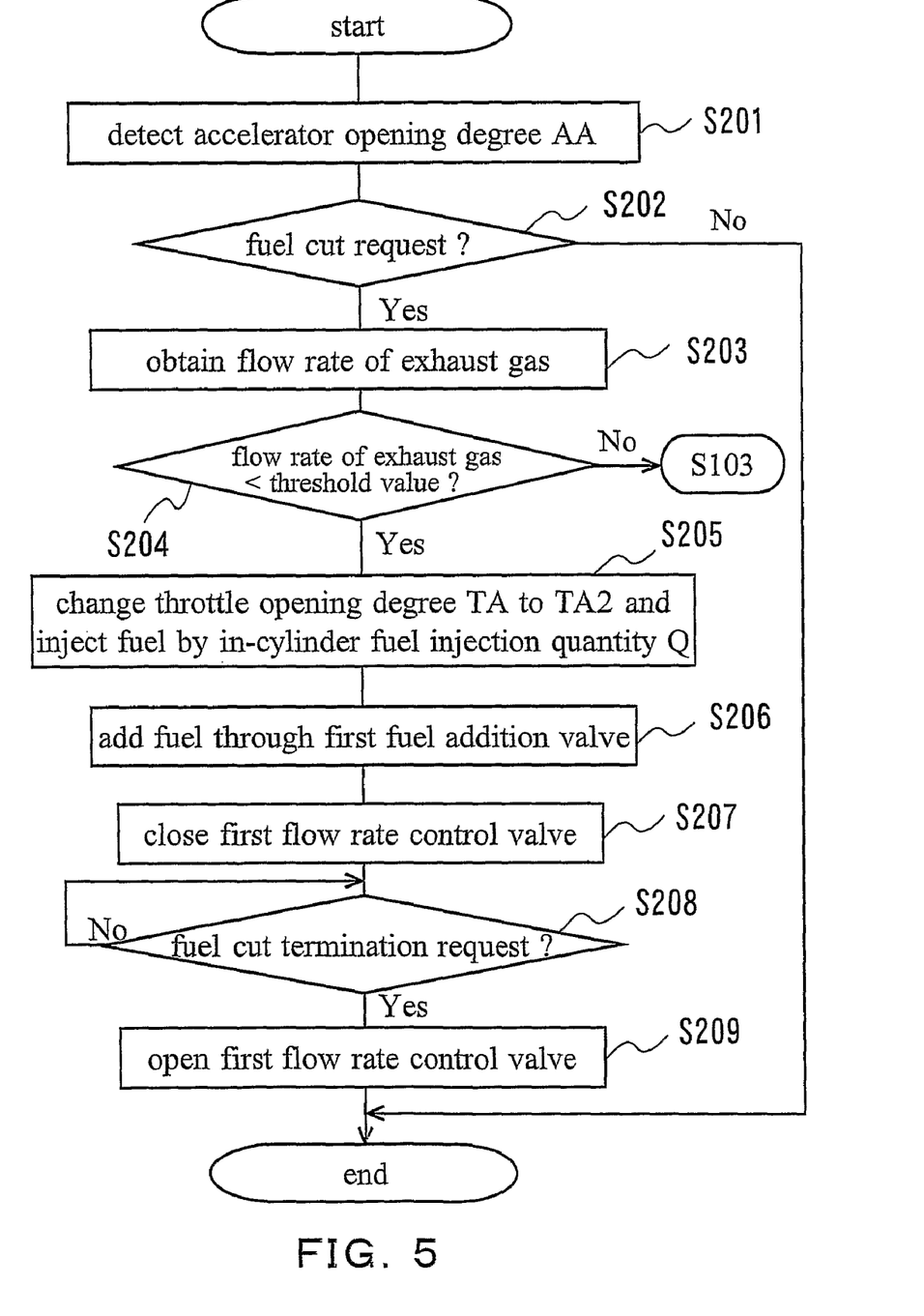
FIG. 5 is a flow chart of a second NOx reduction routine according to the second embodiment.

FIG. 5 is a flow chart of a second NOx reduction routine according to the second embodiment. This routine is a program stored in the ROM in the ECU 30 and executed at predetermined time intervals while the internal combustion engine 1 is running. The process of step S201 and S202 in this routine is the same as that in step S101 and S102 in the NOx reduction routine according to the first embodiment, and that process will not be further described in detail. If it is determined in step S202 that the fuel cut request is made, the process proceeds to step S203.

In step S203, the flow rate of the exhaust gas flowing in the first branch passage 10a is obtained. The flow rate of the exhaust gas may be obtained by, for example, estimation based on the intake air quantity detected by an air flow meter that is not shown in the drawings. After completion of the process of step S203, the process proceeds to step S204.

In step S204, a determination is made as to whether or not the flow rate of the exhaust gas obtained in step S203 is smaller than a predetermined threshold value. In other words, in this step, a determination is made as to whether or not fuel cannot be introduced into the first exhaust gas purification apparatus 11a if fuel is added through the first fuel addition valve 13a. If it is determined here that the flow rate of the exhaust gas is larger than or equal to the threshold value, it is considered that the fuel can be introduced into the first exhaust gas purification apparatus 11a if the fuel is added through the first fuel addition valve 13a during the aforementioned torque change moderating control. In this case, the process of step S103 and the subsequent steps in the NOx reduction routine according to the first embodiment is executed. On the other hand, if it is determined that the flow rate of the exhaust gas is smaller than the threshold value, it is considered that the flow rate of the exhaust gas is so small that fuel cannot be introduced into the first exhaust gas purification apparatus 11a even if fuel is added through the first fuel addition valve 13a. Thus, in this case, the process proceeds to step S205.

In step S205, the throttle opening degree TA is changed to and maintained at a predetermined opening degree TA2 over a predetermined time period, and fuel is injected through the in-cylinder fuel injection valve 4 by in-cylinder fuel injection quantity Q2. After completion of the process of step S205, the process proceeds to step S206. The process of steps S206 through S209 corresponds to the process of steps S104 through S107 in the NOx reduction routine in the first embodiment, and that process will not be further described in detail. After completion of the process of step S209, execution of this routine is once terminated.

As per the above, in this embodiment, the fuel added through the first fuel addition valve 13a can be introduced into the first exhaust gas purification apparatus 11a with reliability even if the flow rate of the exhaust gas flowing in the first branch passage 10a is excessively small when fuel cut is executed in the internal combustion engine 1.

Third Embodiment

Figure 6:
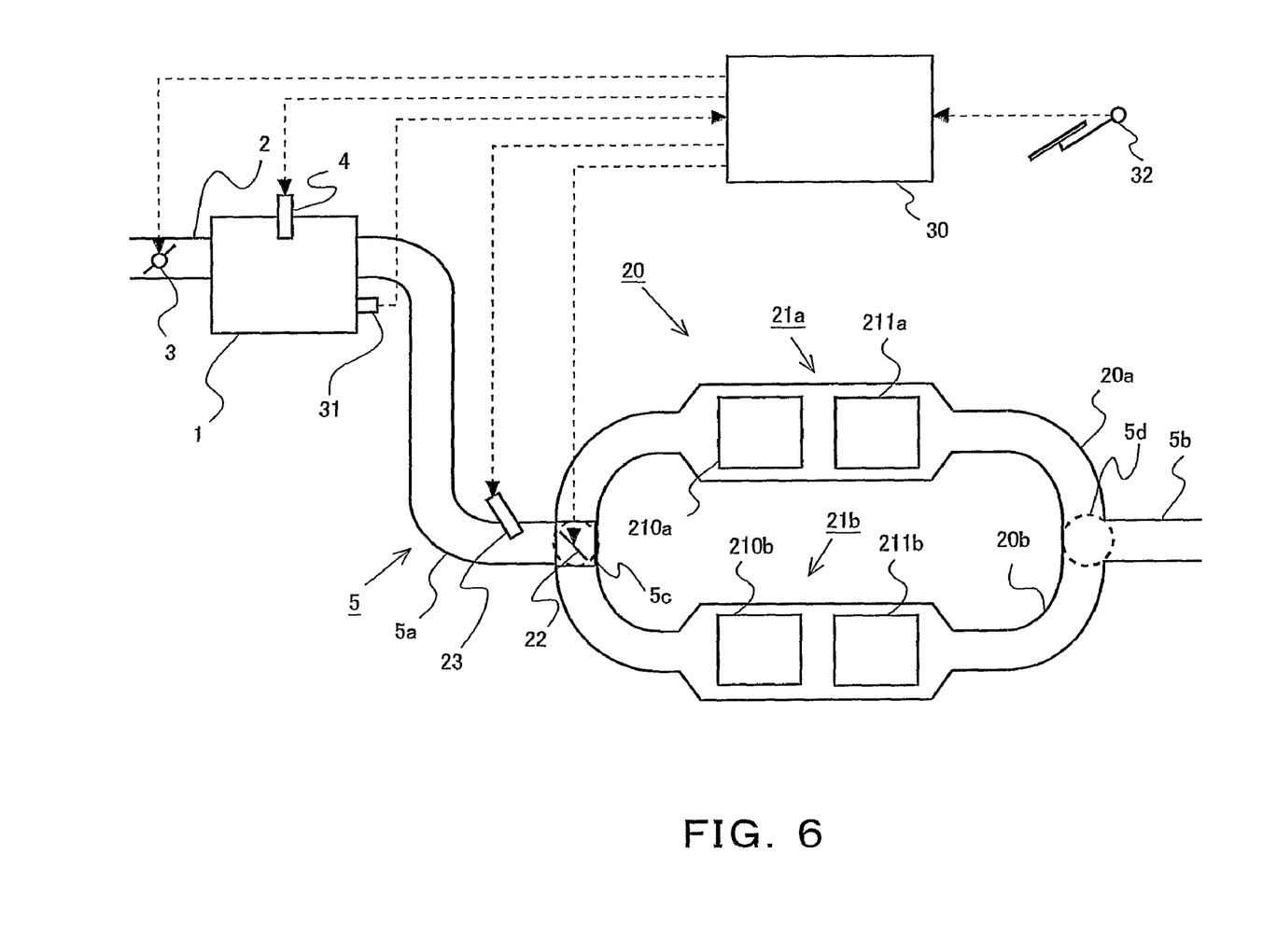
FIG. 6 is a diagram schematically showing the general structure of the internal combustion engine and its exhaust and control systems according to a third embodiment.

Next, a third embodiment of the present invention will be described. FIG. 6 schematically shows the general structure of an internal combustion engine 1 and its exhaust system and control system according to this embodiment. Elements the same as or similar to those in the exhaust gas purification system according to the first embodiment will be denoted by the same reference signs, and a detailed description thereof will be omitted.

In this embodiment, the exhaust pipe 5 is provided with an exhaust gas purification portion 20 disposed at some midpoint thereof to remove particulate matter (e.g. soot) and NOx contained in the exhaust gas. Hereinafter, the portion of the exhaust pipe 5 upstream of the exhaust gas purification portion 20 will be referred to as the first exhaust pipe 5a, and the portion of exhaust pipe 5 downstream of the exhaust gas purification portion 20 will be referred to as the second exhaust pipe 5b. The first exhaust pipe 5a branches at a branching portion 5c into a first branch passage 20a and a second branch passage 20b. The first branch passage 20a and the second branch passage 20b merge at a merging portion 5d. In this embodiment, the first branch passage 20a and the second branch passage 20b constitute branch passages in the present invention.

The first branch passage 20a is provided with a first exhaust gas purification apparatus 21a that removes NOx contained in the exhaust gas and traps particulate matter (e.g. soot) in the exhaust gas. Similarly, the second branch passage 20b is provided with a second exhaust gas purification apparatus 21b.

In the interior of the first exhaust gas purification apparatus 21a in this embodiment are provided a first NOx catalyst 210a on which NOx storage reduction catalyst is supported and a first filter 211a composed of a filter for trapping particulate matter in the exhaust gas and NOx storage reduction catalyst supported thereon. The first NOx catalyst 210a and the first filter 211a are arranged in series in order from the upstream side. Similarly, in the interior of the second exhaust gas purification apparatus 21b are provided a second NOx catalyst 210b and a second filter 211b arranged in order from the upstream side. In this embodiment, the first NOx catalyst 210a, the first filter 211a, the second NOx catalyst 210b and the second filter 211b constitute the NOx storage reduction catalyst in the present invention.

In the branching portion 5c is provided a third flow rate control valve 22 that changes the flow rate of the exhaust gas flowing in the first branch passage 20a and the second branch passage 20b. In this embodiment, the third flow rate control valve 22 constitutes the exhaust gas flow rate changing unit in the present invention.

In FIG. 6, the first exhaust pipe 5a is provided with a third fuel addition valve 23 disposed upstream of the third flow rate control valve 22. The third fuel addition valve 23 is adapted to add fuel as reducing agent into the exhaust gas when the NOx reduction process etc. is executed for the first exhaust gas purification apparatus 21a or the second exhaust gas purification apparatus 21b. In this embodiment, the third fuel addition valve 23 constitutes the reducing agent supply unit in the present invention. The third flow rate control valve 22 and the third fuel addition valve 23 in this embodiment are connected to the ECU 30 by electrical wiring and controlled by the ECU 30.

Figure 7:
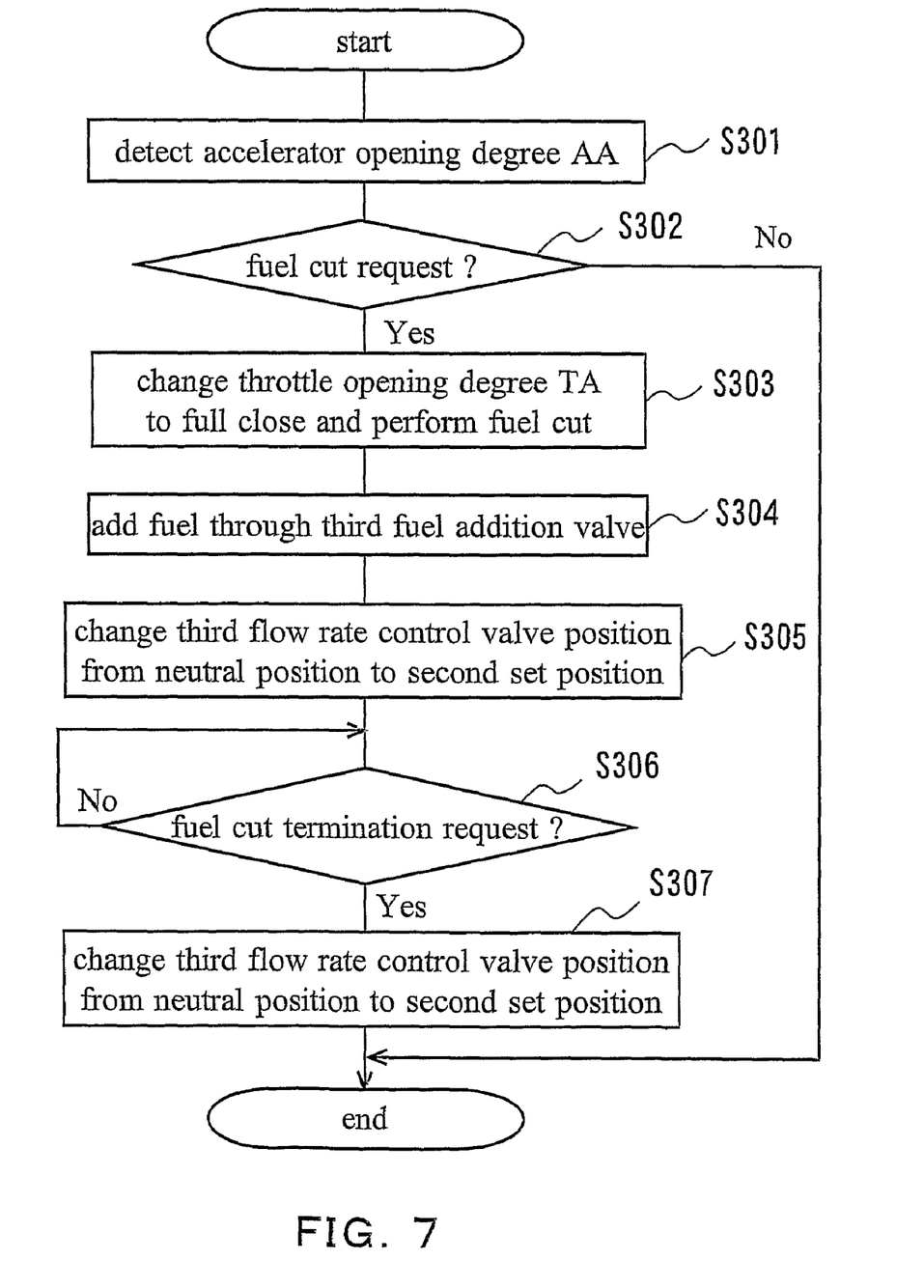
FIG. 7 is a flow chart of an SOx poisoning elimination routine according to the third embodiment.

In the following, a control process in executing SOx-poisoning elimination process for the first exhaust gas purification apparatus 21a and the second exhaust gas purification apparatus 21b according to the second embodiment will be described. FIG. 7 is a flow chart of an SOx poisoning elimination routine according to this embodiment. This routine is a program stored in the ROM in the ECU 30.

This routine is executed when the SOx poisoning elimination process is executed in a state in which fuel cut is not executed in the internal combustion engine 1 (which will be hereinafter referred to as "normal operating state") and the third flow rate control valve 22 is set at a position that allows the exhaust gas to pass through both the first branch passage 20a and the second branch passage 20b (which position will be hereinafter referred to as the "neutral position"). The SOx poisoning elimination process executed in the above described state will be hereinafter referred to as the "normal time SOx poisoning elimination process".

In the following, a description will be made of a case in which the SOx poisoning elimination process is executed for the first exhaust gas purification apparatus 21a by way of example. When the normal time SOx poisoning elimination process is executed, fuel is added into the exhaust gas through the third fuel addition valve 23. When fuel is introduced into the first exhaust gas purification apparatus 21a (including the first NOx catalyst 210a and the first filter 211a), the ambient atmosphere of the first NOx catalyst 210a and the first filter 211a becomes a rich atmosphere, and the bed temperature rises due to oxidation of fuel. When the bed temperature becomes high (e.g. 600° C.-650° C.) SOx poisoning of the first NOx catalyst 210a and the first filter 211a is eliminated thanks to the presence of the reducing agent.

The SOx poisoning elimination routine is executed while the normal time SOx poisoning elimination process is executed. The process of steps S301 to S303 in this routine is the same as the process of steps S101 to S103 in the NOx reduction routine, and that process will not be further described in detail. In step S304, a predetermined quantity of fuel is added into the exhaust gas through the third fuel addition valve 23. Here, the predetermined quantity may be determined based on the amount of SOx stored in the first exhaust gas purification apparatus 21a (including the first NOx catalyst 210a and the first filter 211a) or determined in advance as a constant quantity. After completion of the process of step S304, the process proceeds to step S305.

In step S305, the position of the third flow rate control valve 22 is changed from the neutral position to a position that makes the flow rate of the exhaust gas flowing through the first branch passage 20a smaller than that through the second branch passage 20b (which position will be hereinafter referred to as the "second set position"). Then, the flow rate of the exhaust gas flowing through the first exhaust gas purification apparatus 21a decreases, and accordingly fuel is allowed to stay in the first exhaust gas purification apparatus 21a. This promotes the SOx reduction reaction, whereby fuel economy associated with the SOx poisoning elimination process can be improved. After completion of the process of step S305, the process proceeds to step S306.

In step S306, a determination is made as to whether or not a fuel cut termination request is made. The process of step S306 is equivalent to the process of step S106 in the NOx reduction routine, and a detailed description thereof will be omitted. If it is determined that the fuel cut termination request is not made, the state after completion of the process of step S305 is maintained. On the other hand, if it is determined that the fuel cut termination request is made, the process proceeds to step S307. In step S307, the position of the third flow rate control valve 22 is changed from the second set position to the neutral position. After completion of the process of step S307, execution of this routine is once terminated.

As per the above, according to the present invention, fuel economy associated with the SOx poisoning elimination process can be improved in cases where fuel cut is executed in the internal combustion engine 1 while the normal time SOx poisoning elimination process is executed. The NOx discharged from the internal combustion engine 1 while the SOx poisoning elimination process is executed is removed by the second exhaust gas purification apparatus 21b from the exhaust gas, and an increase in harmful emissions can be prevented accordingly.

An estimation of the amount of SOx stored in the first exhaust gas purification apparatus 21a (including the first NOx catalyst 210a and the first filter 211a) may be performed at the time of termination of the SOx poisoning elimination routine. In addition, if it is necessary to execute the SOx poisoning elimination process for the first exhaust gas purification apparatus 21a, the normal time SOx poisoning elimination process may be executed.

When the position of the third flow rate control valve 22 is changed to the second set position that makes the flow rate of the exhaust gas flowing through the first branch passage 20a smaller than that through the second branch passage 20b in step S305 of the above described routine, the flow rate of the exhaust gas flowing through the first branch passage 20a may be made equal to zero. In that case, fuel is caused to stay in the first NOx catalyst 210a and the first filter 211a and the bed temperature of the first NOx catalyst 210a and the first filter 211a can be kept high, more reliably. Accordingly, the efficiency of the SOx poisoning elimination process for the first exhaust gas purification apparatus 21a can be enhanced, and fuel economy associated with the SOx poisoning elimination process can be improved.

While the invention has been described in terms of preferred embodiments, those skilled in the art will recognize that the invention can be practiced with modifications within the spirit and scope of the appended claims.

Industrial Applicability

According to the invention, in executing performance regeneration process for an NOx storage reduction catalysts provided in a plurality of branch passages branching from an exhaust passage, the efficiency of the performance regeneration process can be enhanced, and NOx discharged from an internal combustion engine can be prevented from being emitted to the atmosphere.

The invention claimed is:

1. An exhaust gas purification system for an internal combustion engine, comprising:
    an exhaust passage one end of which is connected to the internal combustion engine and through which exhaust gas from the internal combustion engine flows;
    a plurality of branch passages branching from said exhaust passage by a branching portion at some midpoint of said exhaust passage;
    an NOx storage reduction catalyst that stores NOx in the exhaust gas when the air-fuel ratio of the inflowing exhaust gas is lean and reduces NOx thus stored when the air-fuel ratio of the inflowing exhaust gas is rich and a reducing agent is present, said NOx storage reduction catalyst being provided in at least one of said plurality of branch passages;
    a reducing agent supply unit for supplying the reducing agent to the exhaust gas to be introduced into said NOx storage reduction catalyst;
    a plurality of flow rate control valves for changing the flow rate of exhaust gas flowing in each branch passage, at least one of the plurality of flow rate control valves being provided in each branch passage;
    a fuel injection valve for injecting fuel to be used in combustion in a cylinder of the internal combustion engine;
    a throttle valve for regulating a flow rate of intake air, the throttle valve being provided in an intake passage of the internal combustion engine; and
    a regeneration unit for, when a fuel cut request is made to the internal combustion engine, executing a performance regeneration process for regenerating performance of said NOx storage reduction catalyst by means of decreasing a quantity of fuel injected through the fuel injection valve and an opening degree of the throttle valve gradually, causing the reducing agent supply unit to supply the reducing agent to said NOx storage catalyst before a flow rate of exhaust gas which flows into said NOx storage catalyst is smaller than a predetermined flow rate, and causing the at least one of the plurality of flow rate control valves which is arranged in each branch passage provided with said NOx storage catalyst to close after the reducing agent supply unit supplied the reducing agent.

2. An exhaust gas purification system for an internal combustion engine according to claim 1, wherein when the flow rate of the exhaust gas flowing into the branch passage provided with said NOx storage reduction catalyst for which said performance regeneration process is to be executed is smaller than the predetermined flow rate after stopping the fuel injection to inject fuel, said regeneration unit causes the reducing agent to be supplied to said NOx storage reduction catalyst after increasing the opening degree of the throttle valve in order to make said flow rate of the exhaust gas larger than or equal to said predetermined flow rate, and thereafter causing the at least one of the plurality of flow rate control valves to close.

3. An exhaust gas purification system for an internal combustion engine according to claim 1, wherein said performance regeneration process is NOx reduction process for releasing NOx stored in said NOx storage reduction catalyst or SOx poisoning elimination process for releasing SOx stored in said NOx storage reduction catalyst.

4. An exhaust gas purification system for an internal combustion engine according to claim 2, wherein said performance regeneration process is NOx reduction process for releasing NOx stored in said NOx storage reduction catalyst or SOx poisoning elimination process for releasing SOx stored in said NOx storage reduction catalyst.

* * * * *